United States Patent
Delgado et al.

(10) Patent No.: US 10,059,257 B2
(45) Date of Patent: Aug. 28, 2018

(54) REAR TRUNK BUTTON LOCALIZATION FOR END USER

(71) Applicant: Ford Global Technologies, LLC, Dearborn, MI (US)

(72) Inventors: Gerardo Brigido Delgado, Livonia, MI (US); Ricardo David Luna Olvera, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/138,969

(22) Filed: Apr. 26, 2016

(65) Prior Publication Data
US 2017/0305333 A1     Oct. 26, 2017

(51) Int. Cl.
  *B60Q 1/30* (2006.01)
  *B60Q 1/26* (2006.01)
(52) U.S. Cl.
  CPC ............ *B60Q 1/30* (2013.01); *B60Q 1/2607* (2013.01); *B60Q 1/2696* (2013.01); *B60Q 2400/20* (2013.01); *B60Q 2900/30* (2013.01)
(58) Field of Classification Search
  CPC ...... B60Q 1/30; B60Q 1/2696; B60Q 1/2607; B60Q 2400/20; B60Q 2900/30
  See application file for complete search history.

(56) References Cited

U.S. PATENT DOCUMENTS

| 5,319,364 | A | * | 6/1994 | Waraksa | ............ | G07C 9/00182 340/5.64 |
| 6,018,292 | A | | 1/2000 | Penny, Jr. | | |
| 6,149,210 | A | | 11/2000 | Hunt et al. | | |
| 6,209,933 | B1 | | 4/2001 | Ang et al. | | |
| 6,369,395 | B1 | | 4/2002 | Roessler | | |
| 7,106,171 | B1 | | 9/2006 | Burgess | | |
| 8,992,057 | B2 | * | 3/2015 | Foley | ...................... | F21S 48/00 362/464 |
| 2006/0271261 | A1 | * | 11/2006 | Flores | ................... | B60Q 9/008 701/49 |
| 2010/0305779 | A1 | * | 12/2010 | Hassan | .................. | G01C 17/38 701/2 |

(Continued)

FOREIGN PATENT DOCUMENTS

| EP | 1039077 A2 | 9/2000 |
| FR | 2934822 A3 | 2/2010 |
| WO | WO 2007073065 A1 | 6/2007 |

OTHER PUBLICATIONS

Search Report dated Sep. 20, 2017 for GB Patent Application No. GB1706591.3 (3 Pages).

*Primary Examiner* — Rodney Allen Butler
(74) *Attorney, Agent, or Firm* — James P. Muraff; Neal, Gerber & Eisenberg LLP (57) ABSTRACT

A system for identifying a location of an external vehicle feature on approach by a user of the vehicle is disclosed, comprising (1) a vehicle including a steering system, a drive system, a brake system, a processor, and memory; (2) a control module coupled to the processor and configured to receive a wireless communication from a mobile device indicative of a user's proximity to the vehicle; and (3) a brake module coupled to the control module and configured to illuminate a lighting device on receipt of the wireless communication to identify a location of the vehicle feature.

16 Claims, 8 Drawing Sheets

(56) References Cited

U.S. PATENT DOCUMENTS

| | | | | |
|---|---|---|---|---|
| 2011/0240695 | A1* | 10/2011 | Aftanas | B60Q 1/2611 |
| | | | | 224/311 |
| 2013/0130674 | A1* | 5/2013 | De Wind | B60Q 1/2619 |
| | | | | 455/420 |
| 2014/0285319 | A1* | 9/2014 | Khan | G07C 9/00309 |
| | | | | 340/5.61 |
| 2015/0116079 | A1* | 4/2015 | Mishra | G07C 9/00007 |
| | | | | 340/5.52 |
| 2015/0197180 | A1* | 7/2015 | Salter | F21S 48/214 |
| | | | | 362/510 |
| 2015/0224919 | A1* | 8/2015 | Sobecki | B60Q 1/2615 |
| | | | | 353/13 |
| 2016/0159274 | A1* | 6/2016 | Salter | B60C 23/0406 |
| | | | | 315/77 |
| 2016/0193957 | A1* | 7/2016 | De Wind | B60Q 1/2619 |
| | | | | 362/23.12 |
| 2016/0257242 | A1* | 9/2016 | Bauch | B60Q 1/22 |
| 2016/0294049 | A1* | 10/2016 | Hermann | G07C 9/00309 |

* cited by examiner

REAR TRUNK BUTTON LOCALIZATION FOR END USER

BACKGROUND

This application relates generally to the field of vehicle lighting, and more particularly to systems and methods to more easily identify a feature of a vehicle with lighting.

Some modern vehicles have keyless entry systems that enable an approaching user to unlock the doors or trunk by pressing a button on a key fob or remote. More recently, some vehicles may be configured to recognize the proximity of the user's key fob in relation to the vehicle, and if the key fob is located within a distance of, for example, 1.5 meters, of the vehicle, the vehicle will allow entry by a driver or user without requiring the driver or user to unlock the vehicle via the key fob or remote. To gain entry of the vehicle without pressing a key fob button or vehicle remote control to unlock the car in situations where fully automatic, hands-free unlocking and motorized opening of the door or trunk is not available or is inactive, the user must open the door by raising or activating a door handle, or by pressing or activating a trunk release button to open the trunk, which may typically be located at the rear of the vehicle. However, the trunk release button on a vehicle is often hidden or not readily visible to the approaching user, resulting in delayed access to the trunk if the user is unable to readily locate the release button.

There exists a need, therefore, for a system or method that brings attention to a vehicle feature to an approaching driver or user to enable the driver or user to readily identify and/or locate the feature.

SUMMARY

An embodiment of a system for identifying a location of an external vehicle feature on approach by a user of the vehicle is disclosed, comprising (1) a vehicle including a steering system, a drive system, a brake system, a processor, and memory; (2) a control module coupled to the processor and configured to receive a wireless communication from a mobile device indicative of a user's proximity to the vehicle; and (3) a brake module coupled to the control module and configured to illuminate a lighting device on receipt of the wireless communication to identify a location of the vehicle feature.

The vehicle feature may be a trunk lid release button. The mobile device may be a key fob or a vehicle remote control. The lighting device may include one or more LED's. The brake module may be configured to illuminate the one or more LED's in a pattern or in a sequence. The one or more LED's may include a plurality of colors.

The brake module may be configured to illuminate the one or more LED's in proximity to the feature while not illuminating other LED's of the lighting device. The brake module may be configured to illuminate all of the one or more LED's in response to receiving an indication of activation of a brake pedal of the vehicle. The brake module may be configured to illuminate the one or more LED's in proximity to the vehicle feature while not illuminating other LED's of the lighting device on receipt of the wireless communication from the mobile device indicative of the user's proximity to the vehicle. The system may include a second brake module coupled to the control module and configured to illuminate all of the one or more LED's on receipt of an indication of activation of a brake pedal of the vehicle. The brake module may be configured to illuminate the one or more LED's in proximity to the vehicle feature in a pattern or in a sequence while not illuminating other LED's of the lighting device on receipt of the wireless communication from the mobile device indicative of the user's proximity to the vehicle.

Another embodiment of a system for identifying a location of an external vehicle feature on approach by a user of the vehicle is disclosed, comprising: (1) a vehicle including a steering system, a drive system, a brake system, a processor, and memory; (2) a control module coupled to the processor and configured to receive a wireless communication from a mobile device indicative of a user's proximity to the vehicle; and (3) a brake module coupled to the control module and configured to illuminate one or more LED's of a lighting device in proximity to the feature on receipt of the wireless communication.

The vehicle feature may be a trunk lid release button. The mobile device may be a key fob. The brake module may be configured to illuminate the one or more LED's in a pattern or in a sequence. The brake module may be configured to illuminate the one or more LED's while not illuminating other LED's of the lighting device. The brake module may be configured to illuminate all of the one or more LED's in response to receiving an indication of activation of a brake pedal of the vehicle. The system may include a second brake module coupled to the control module and configured to illuminate all of the one or more LED's on receipt of an indication of activation of a brake pedal of the vehicle.

Another embodiment of a system for identifying a location of an external vehicle feature on approach by a user of the vehicle is disclosed, comprising: (1) a vehicle including a steering system, a drive system, a brake system, a processor, and memory; (2) a control module coupled to the processor and configured to receive a wireless communication from a mobile device indicative of a user's proximity to the vehicle; (3) a brake module coupled to the control module and configured to illuminate one or more LED's of a lighting device in proximity to the feature on receipt of the wireless communication; and (4) a second brake module coupled to the control module and configured to illuminate all of the one or more LED's on receipt of an indication of activation of a brake pedal of the vehicle.

The vehicle feature may be a trunk lid release button, and the brake module may be configured to illuminate the one or more LED's in a pattern or in a sequence in proximity to the trunk release button.

DETAILED DESCRIPTION

Although the figures and the instant disclosure describe one or more embodiments of a system and method that brings attention to a vehicle feature to an approaching driver or user to enable the driver or user to readily identify and/or locate the feature, one of ordinary skill in the art would appreciate that the teachings of the instant disclosure would not be limited to these embodiments.

Turning now to the drawings wherein like reference numerals refer to like elements, there are shown exemplary embodiments of systems and methods that bring attention to a vehicle feature to an approaching driver or user to enable the driver or user to readily identify and/or locate the feature.

Figure 1A:
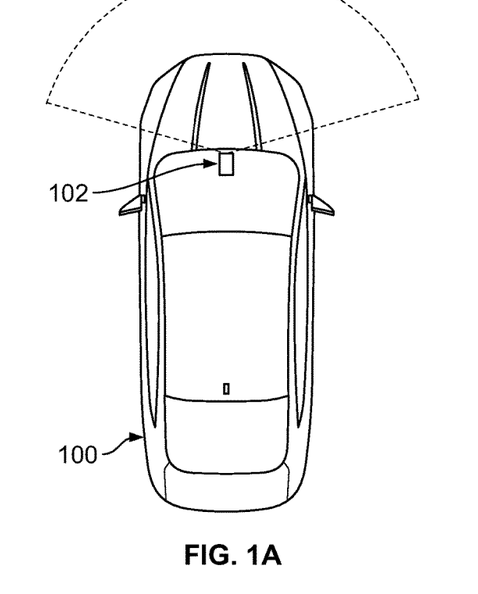
FIG. 1A illustrates a top view of a vehicle of the instant disclosure.
Figure 1B:
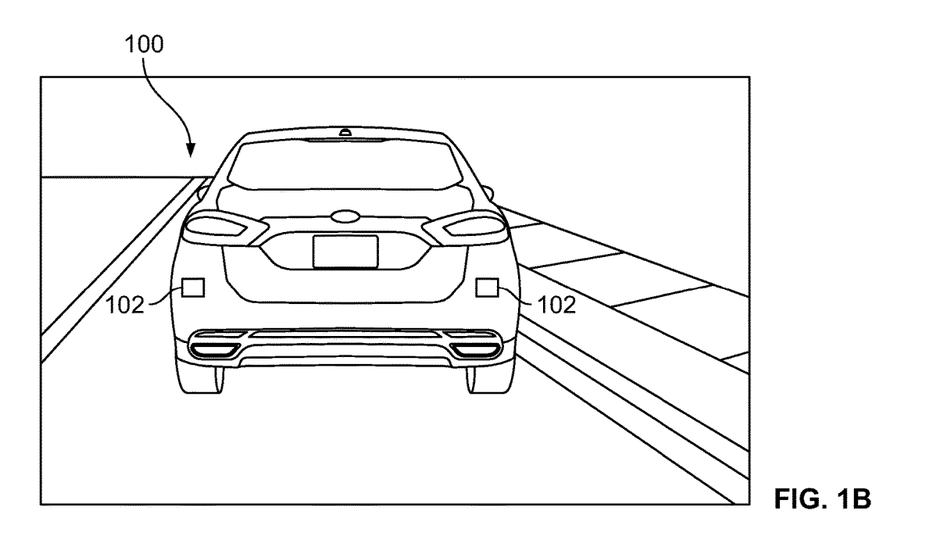
FIG. 1B illustrates a rear view of the vehicle shown in FIG. 1A.

FIGS. 1A-1B show vehicle 100 in accordance with one embodiment of the instant disclosure. In this embodiment, vehicle 100 is an automobile, though in other embodiments vehicle 100 may be any suitable vehicle (such as a truck, a watercraft, or an aircraft). Vehicle 100 may be a gasoline powered vehicle, a hybrid vehicle, an electric vehicle, a fuel cell vehicle, or any other type of suitable vehicle. Vehicle 100 may include standard features, such as a dashboard, adjustable seats, one or more batteries, an engine or motor, a transmission, an HVAC system including a compressor and electronic expansion valve, a windshield and/or one or more windows, doors, a rear view mirror, a right side view mirror, a left side view mirror, seatbelts, airbags, wheels, and tires.

Figure 2:
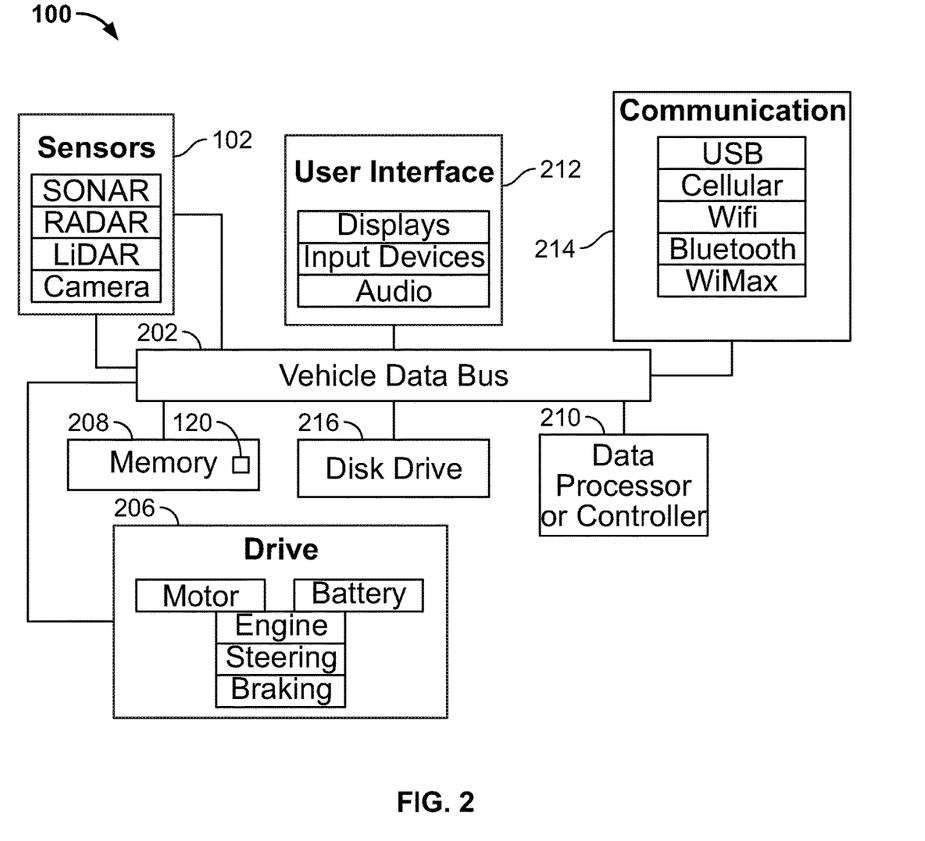
FIG. 2 illustrates a block diagram of exemplary components of the vehicle shown in FIG. 1A.

As shown in FIGS. 1A-1B and 2, vehicle 100 may include sensors 102, which may be arranged in and around the vehicle in a suitable fashion. Sensors 102 can all be the same or they can vary from one to the next. Sensors 102 may include many sensors or only a single sensor.

Certain of the sensors 102 may be configured to obtain data about the environment surrounding the vehicle (e.g., position sensors or weather sensors), as indicated by the dashed line in FIG. 1A, while others obtain data about components of the vehicle itself (e.g., gas level sensors or oil pressure sensors). The sensors 102 may be configured to transmit the data they obtain to one or more controllers of the vehicle 100, such as to controller 210 (described below), for further processing. The sensors 102 may include any suitable sensor or sensors such as, but not limited to: (1) infrared sensors; (2) visual sensors (such as cameras); (3) ultrasonic sensors; (4) RADAR; (5) LIDAR; (6) laser-scan sensors; (7) inertial sensors (for example, an inertial measurement unit); (8) wheel speed sensors; (9) road condition sensors (to directly measure certain road conditions); (10) rain sensors; (11) suspension height sensors; (12) steering wheel angle sensors; (13) steering torque sensors; (14) brake pressure sensors; (15) tire pressure sensors; or (16) vehicle location or navigation sensors (such as a Global Positioning System). Sensors 102 may include gear sensors configured to detect gear engagement of the vehicle's transmission, accelerometers configured to detect vehicle acceleration, speed sensors to detect vehicle speed, wheel speed, and/or steering wheel speed, torque sensors to detect engine or motor output torque, driveline torque, and/or wheel torque, and position sensors to detect steering wheel angular position, brake pedal position, and/or mirror position. Some sensors 102 may be mounted inside the passenger compartment of vehicle 100, around the exterior of the vehicle, or in the engine compartment of vehicle 100. At least one sensor 102 may be used to identify the vehicle's driver via facial recognition, speech recognition, or communication with a device, such as a vehicle key or mobile phone personal to the driver.

Sensors 102 may have an OFF state and various ON states. Vehicle 100, or a device operatively connected to the vehicle, may be configured to control the states or activity of the sensors. It should be appreciated that the term "internal sensors" includes all sensors mounted to the vehicle, including sensors that are mounted to an exterior of vehicle 100.

As shown in FIG. 2, in one embodiment, vehicle 100 includes a vehicle data bus 202 operatively coupled to sensors 102, vehicle drive devices 206, memory or data storage 208, a processor or controller 210, a user interface 212, communication devices 214, and a disk drive 216.

The processor or controller 210 may be any suitable processing device or set of processing devices such as, but not limited to: a microprocessor, a microcontroller-based platform, a suitable integrated circuit, or one or more application-specific integrated circuits (ASICs).

The memory 208 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); read-only memory; a hard drive; a solid state hard drive; or a physical disk such as a DVD. In an embodiment, the memory includes multiple kinds of memory, particularly volatile memory add non-volatile memory.

The communication devices 214 may include a wired or wireless network interface to enable communication with an external network. The external network may be a collection of one or more networks, including standards-based networks (e.g., 2G, 3G, 4G, Universal Mobile Telecommunications Autonomous valet parking system (UMTS), GSM® Association, Long Term Evolution (LTE)™, or more); WMAX; BLUETOOTH; near field communication (NFC); Wi-Fi (including 802.11 a/b/g/n/ac or others); WiGig; Global Positioning System (GPS) networks; and others available at the time of the filing of this application or that may be developed in the future. Further, the external network(s) may be a public network, such as the Internet; a private network, such as an intranet; or combinations thereof, and may utilize a variety of networking protocols now available or later developed including, but not limited to, TCP/IP-based networking protocols. The communication devices 214 may also include a wired or wireless interface to enable direct communication with an electronic device, such as a USB or BLUETOOTH interface.

The user interface 212 may include any suitable input and output devices. The input devices enable a driver or a passenger of vehicle 100 to input modifications or updates to information shown in, for example, a vehicle display. The input devices may include, for instance, a control knob, an instrument panel, a keyboard, a scanner, a digital camera for image capture and/or visual command recognition, a touch screen, an audio input device (e.g., cabin microphone), buttons, a mouse, or a touchpad. The output devices may include instrument cluster outputs (e.g., dials, lighting devices), actuators, a display (e.g., a liquid crystal display ("LCD"), an organic light emitting diode ("OLED"), a flat panel display, a solid state display, a cathode ray tube ("CRT"), or a heads-up display), and speakers. It should be appreciated that the term pressing a button or feature also includes pressing or activating a virtual button or feature, such as using a mouse to click on an item on a display, or pressing a virtual button on a touch screen.

The disk drive 216 is configured to receive a computer readable medium. In certain embodiments, the disk drive 216 receives the computer-readable medium on which one or more sets of instructions. The instructions may embody one or more of the methods or logic as described herein. In a particular embodiment, the instructions may reside completely, or at least partially, within any one or more of the main memory 208, the computer readable medium, and/or within the processor 210 during execution of the instructions.

The term "computer-readable medium" should be understood to include a single medium or multiple media, such as a centralized or distributed database, and/or associated caches and servers that store one or more sets of instructions. The term "computer-readable medium" also includes any tangible medium that is capable of storing, encoding or carrying a set of instructions for execution by a processor or that cause a system to perform any one or more of the methods or operations disclosed herein.

In one embodiment, the vehicle 100 includes a one or more computer programs or subprograms 120 stored in the memory 208. When executed by the processor, the one or more computer programs or subprograms 120 generate or select instructions for other elements of the vehicle to perform. In various embodiments, the one or more computer programs or subprograms 120 are configured to direct instructions to the user interface 212, the communication devices 214, the vehicle drive 206, the sensors 102, the processor 210, and any other component operatively connected to the vehicle data bus 202. It should be appreciated that vehicle 100 may be fully autonomous or partially autonomous.

Figure 3:
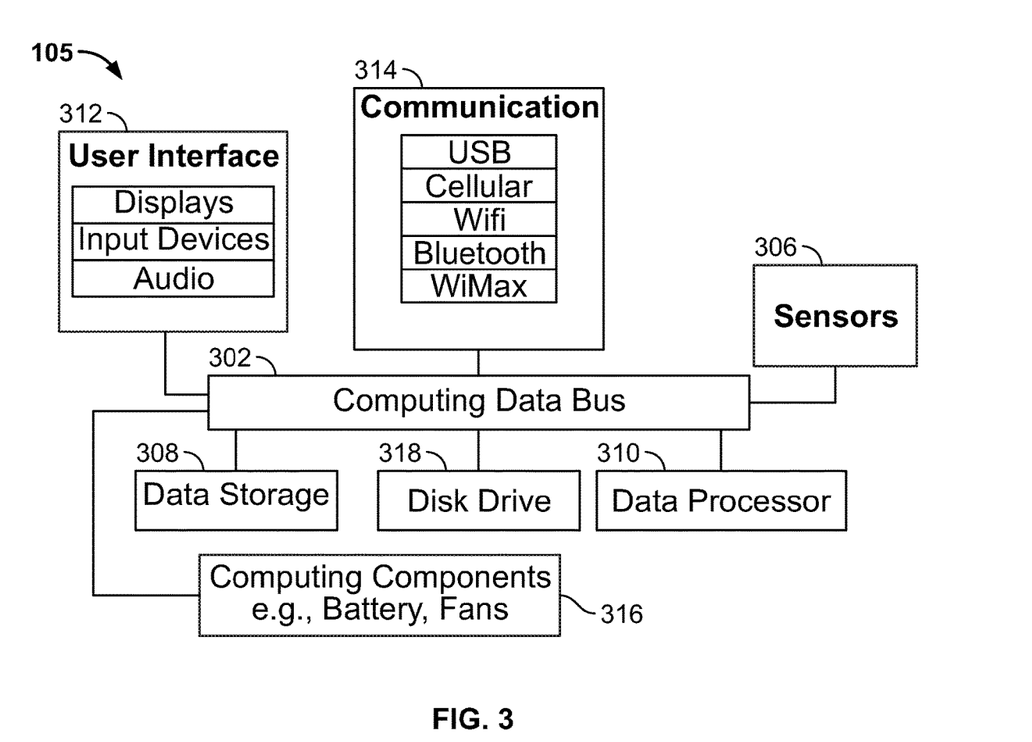
FIG. 3 illustrates a block diagram of an exemplary computing device operatively connected to the vehicle shown in FIG. 1A.

In various embodiments, a computing device 105 is operatively connected to the vehicle 100 via any suitable data connection such as BLUETOOTH, USB, cellular, Low Frequency (LF), near field communication (NFC), or non-cellular Ultra High Frequency (UHF) data connection. In one embodiment, shown in FIG. 3, the computing device 105 includes a data bus 302, operatively coupled to sensors 306, components 316, memory or data storage 308, a processor or controller 310, a user interface 312, and communication devices 314. It should be appreciated that the features of the computing device 105 may be similar to the features of the vehicle 100 as described above. For example, the communication devices 314 of the computing device 105 may operate similar to the communication devices 214 of the vehicle 100. The same applies to the user interface 312, the sensors 306, the data storage 308, the processor 310, and the disk drive 318. In various embodiments, the computing device 105 may be a mobile phone, a tablet computer, a laptop computer, a key fob, a display fob (i.e., a key fob having a display that may or may not be a touchscreen display), or a server.

Figure 4:
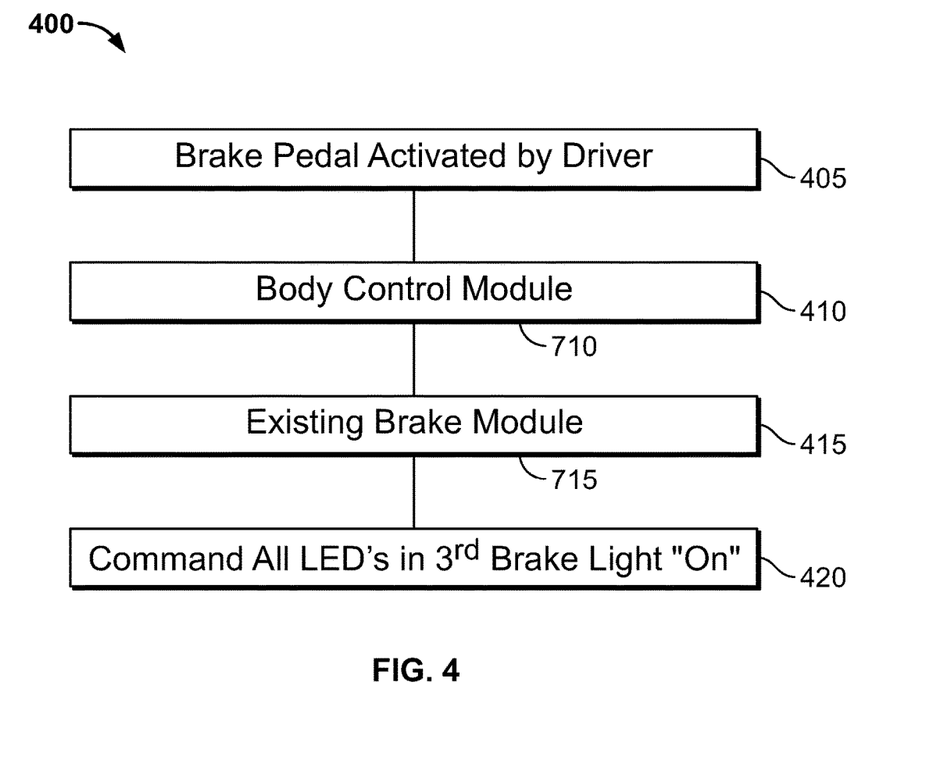
FIG. 4 illustrates a schematic of one embodiment of the instant disclosure.

Turning to FIG. 4, there is shown a schematic of one embodiment of a method 400 for controlling the lighting of one or more lighting devices 725 on a vehicle. The lighting devices 725 may include any device or portion thereof that illuminates, including one or more light emitting diodes (LED's), one or more incandescent light bulbs, one or more light assemblies comprising one or more LED's and/or incandescent light bulbs, and any combination of the foregoing. In some embodiments, the lighting devices 725 may include one or more tail lights. In some embodiments, the lighting devices 725 may include one or more rear stop lights. In some embodiments, the lighting devices 725 may include one or more headlights, running lights, body lights, fender lights, door lights, accent lights, and/or fog lights. In some embodiments, the lighting devices 725 may include one or more lights configured to illuminate the vicinity of vehicle 100 such as the ground near the doors, trunk, hood, and/or one or more of the vehicle's wheels. In some embodiments, the lighting devices 725 may include one or more lights configured to illuminate one or more exterior portions of vehicle 100. In some embodiments, the lighting devices 725 may be configured to signal to an approaching driver or user of vehicle 100 the location of the vehicle, as parked.

In some embodiments, the lighting devices 725 may be configured to signal or otherwise draw attention to an approaching driver or user of vehicle 100 the location of one or more exterior features of vehicle 100. Such exterior features may include a trunk lid release button or switch, one or more door handles including a predetermined and/or a selected one or more door handles, a hood release button or lever, a fuel or gasoline refueling cover, and/or and electric power receptacle cover.

In this embodiment, method 400 includes the steps of: (1) receiving an indication from a brake pedal sensor of the activation of the brake pedal of vehicle 100 by a driver at step 405, (2) receiving and processing, at step 410, the indication from the brake pedal sensor by a control, such as body control module 710, and processing and/or initiating a command to activate one or more lights on the exterior of vehicle 100, (3) receiving and processing, at step 415, the command to activate one or more lights on the exterior of vehicle 100 by another control module of the vehicle 100, such as brake module 715, and initiating a command to activate one or more lights on the exterior of vehicle 100, (4) activating and/or illuminating, at step 420, all of the lights associated with the one or more lighting devices 725 of vehicle 100.

Figure 5:
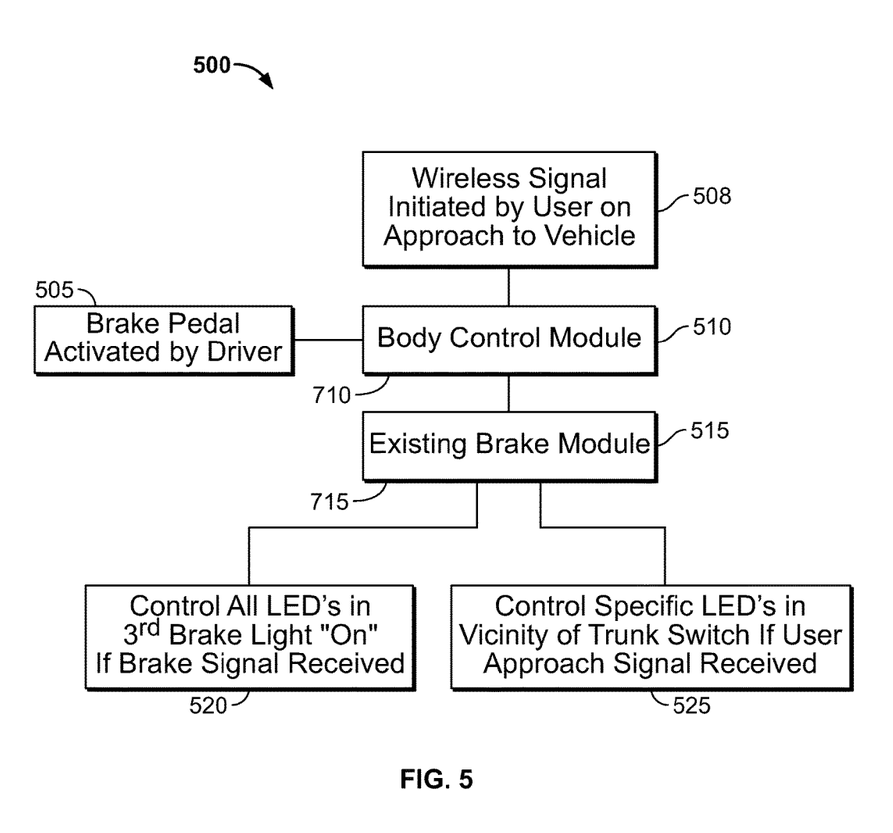
FIG. 5 illustrates a schematic of another embodiment of the instant disclosure.

Turning to FIG. 5, there is shown a schematic of another embodiment of a method 500 for controlling the lighting of one or more lighting devices 725 on a vehicle. In this embodiment, method 500 includes the steps of: (1) receiving, at step 508, a wireless communication from a mobile device, such as mobile device 705, in a predetermined vicinity of vehicle 100, (2) alternatively, receiving an indication from a brake pedal sensor of the activation of the brake pedal of vehicle 100 by a driver at step 505, (3) receiving and processing, at step 510, by a control module, such as body control module 710, either the indication from the brake pedal sensor or the wireless communication from the mobile device, and processing and/or initiating a command to activate one or more lights on the exterior of vehicle 100, (4) receiving and processing, at step 515, the command to activate one or more lights on the exterior of vehicle 100 by another control module of the vehicle 100, such as brake module 715, and initiating a command to activate one or more lights on the exterior of vehicle 100, (5) activating and/or illuminating, at step 520, all of the lights associated with a third (safety) brake light of vehicle 100 if an indication from the brake pedal sensor is received by the body control module 710, or (6) activating and/or illuminating, at step 525, a predetermined one or a predetermined subset of all of the lights in a lighting device 725 of vehicle 100 if a wireless communication from the mobile device 705 is received by the body control module 710.

In one embodiment, a specific one or subset of the total number of LED's that are present in a lighting device 725 are commanded to turn on when a wireless communication indicative of an approaching driver or user of the vehicle 100 is received by body control module 510. The specific one or subset of the total number of LED's may be predetermined based on their proximity to a feature of the vehicle 10 to be illuminated or otherwise highlighted, such as a trunk button or switch, to draw attention to the location of the feature to the approaching driver or user of vehicle 100.

Mobile device 705, like computing device 105, may include a mobile phone, a tablet computer, a laptop computer, a key fob, or a display fob (i.e., a key fob having a display that may or may not be a touchscreen display).

Body control module 710 or other wireless communication module on the vehicle may communicate wirelessly with mobile device 705. Any number of wireless protocols known to one of ordinary skill may be utilized to communicate wirelessly between mobile device 705 and vehicle 100 include WiFi, BLUETOOTH, cellular, Low Frequency (LF), near field communication (NFC), and non-cellular Ultra High Frequency (UHF). In addition, wireless communication between mobile device 705 and vehicle 100 may be relayed via any number and type of communication devices, such as one or more computer servers, web servers, cloud servers, gateways, access points, and the like. In one embodiment, wireless communication between mobile device 705 and vehicle 100 may be conducted via an array of Wi-Fi hot spots making up a local private network. In yet another embodiment, wireless communication between mobile device 705 and vehicle 100 may be conducted via near-field communication. In yet another embodiment, wireless communication between mobile device 705 and vehicle 100 may be conducted via a private cellular network. In one embodiment, wireless communication between mobile device 705 and vehicle 100 is conducted in real-time or near real-time, such as via one or more of the foregoing methods and protocols, to eliminate communication latency or delay and to maximize the distance from vehicle 100 that the approaching driver or user will begin to see the visual locator and/or beacon of the vehicle feature according to the teachings herein.

Figure 6:
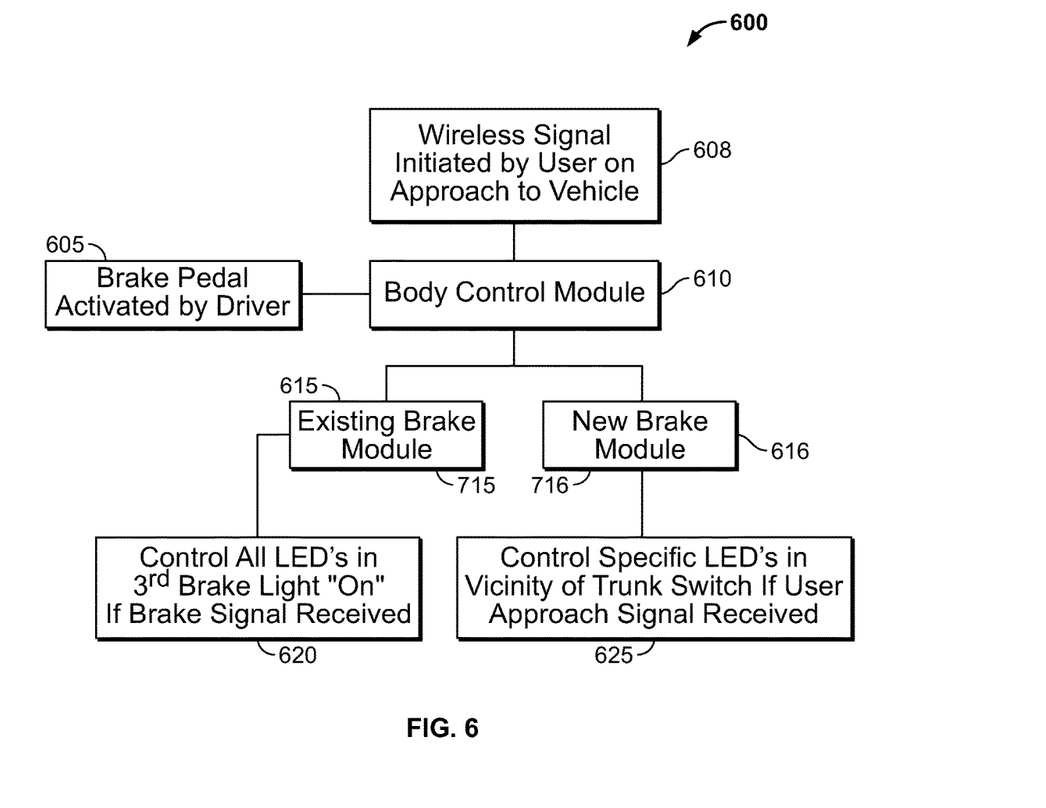
FIG. 6 illustrates a schematic of another embodiment of the instant disclosure.

Turning to FIG. 6, there is shown a schematic of another embodiment of a method 600 for controlling the lighting of one or more lighting devices 725 on a vehicle. This embodiment is similar to the prior embodiment except that it includes a dedicated control module, such as an additional brake control module, to activate or control the one or more lighting devices 725 for beacon purposes to locate a feature apart from the control of lighting devices 725 for brake light purposes on vehicle 100. In this embodiment, method 600 includes the steps of: (1) receiving at step 608 a wireless communication from a mobile device, such as mobile device 705, in a predetermined vicinity of vehicle 100, (2) alternatively, receiving an indication from a brake pedal sensor of the activation of the brake pedal of vehicle 100 by a driver at step 605, (3) receiving at step 610 by a body control module, such as body control module 710, either the indication from the brake pedal sensor or the wireless communication from the mobile device 705, and processing and/or initiating a command to activate one or more lights on the exterior of vehicle 100, (4) if the body control module receives an indication from the brake pedal sensor of the activation of the brake pedal of vehicle 100, then at step 615 the method 600 includes receiving and processing the command to activate one or more brake lights of vehicle 100 by a first brake module 715 of the vehicle 100, and at step 620, activating and/or illuminating all of the lights associated with the one or more brake lights of vehicle 100, (5) alternatively, if the body control module receives a wireless communication from a mobile device, such as mobile device 705, in a predetermined vicinity of vehicle 100, then at step 616 the method 600 includes receiving and processing the command to activate one or more lights on the exterior of vehicle 100 by a second brake module 716 of the vehicle 100, and at step 625, activating and/or illuminating a predetermined one or a predetermined subset of all of the lights in a lighting device 725 of vehicle 100. First brake module 715 and second brake module 716 may be wired in parallel to activate a single light or LED or a set of lights or LED's to serve as a locating pattern of a feature of the vehicle 100. The lighting device 725 may be the one or more brake lights of the vehicle 100.

Figure 7:
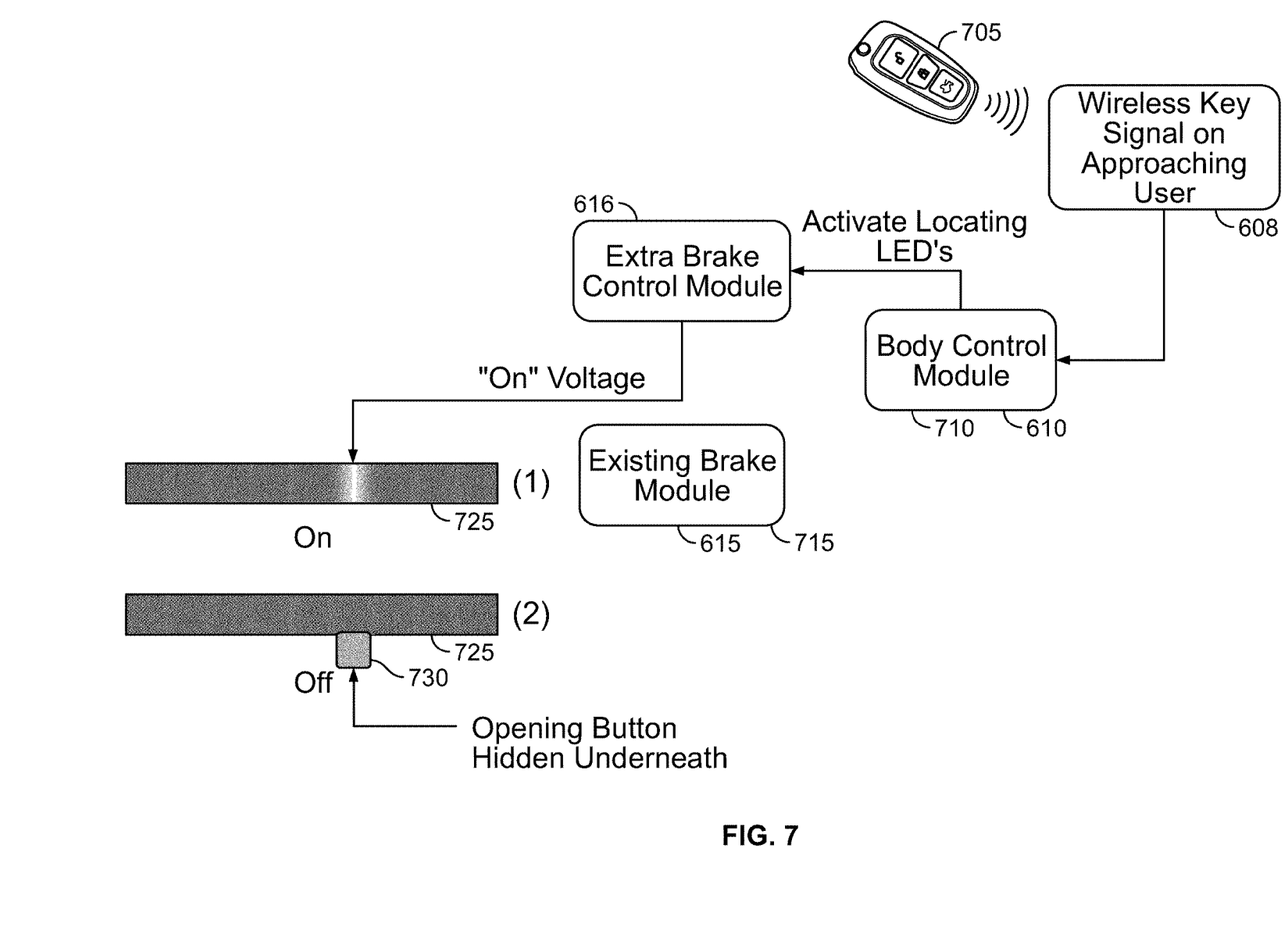
FIG. 7 illustrates a schematic of another embodiment of the instant disclosure.

Turning to FIG. 7, there is shown one embodiment of a system 700 for carrying out at least a portion of the steps of method 600 to illuminate or bring attention to an approaching driver or user of a feature 730 of vehicle 100, such as trunk lid release button. In this embodiment, system 700 includes body control module 710, second brake control module 716, and lighting device 725. As shown in FIG. 7, one or a subset of lights or LED's of lighting device 725 may be commanded to turn on in the vicinity of feature 730 of vehicle 100, such as a trunk lid release button to illuminate or bring attention to an approaching driver or user of the location of feature 730, which may be hidden from view due to its orientation or size. In this embodiment, lighting device 725 is shown as having only one or a subset of lights or LED'S of lighting device 725 commanded in the "on" position at (1) and is shown as having all of the lights or LED's commanded in the "off" position at (2). In some embodiments, a predetermined one or a subset of lights or LED's are controlled by second brake control module 716 to blink in the same color as the rest of the lights or LED's of lighting device 725. In another embodiment, a predetermined one or a subset of lights or LED's are controlled by second brake control module 716 to blink in a different color as the rest of the lights or LED's of lighting device 725.

Figure 8:
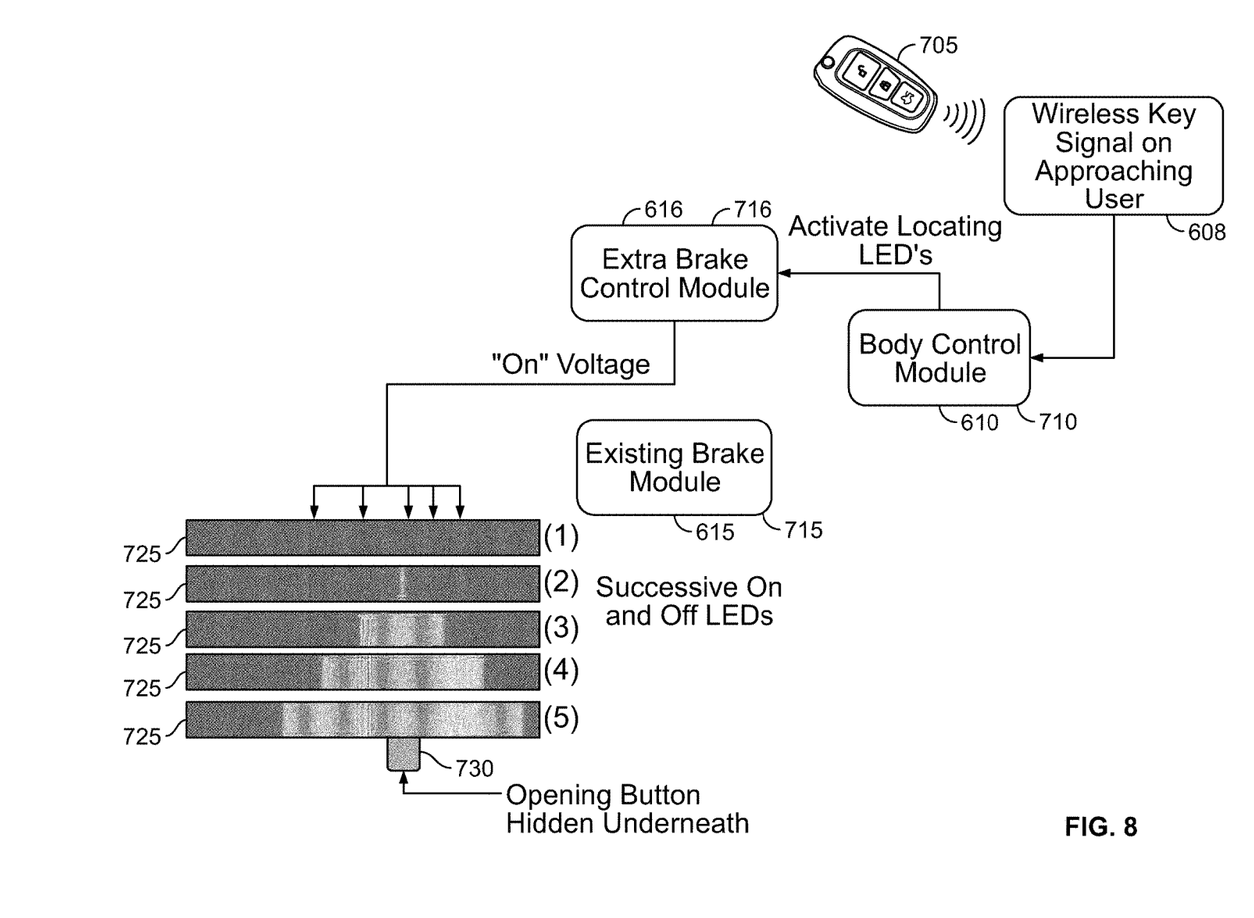
FIG. 8 illustrates a schematic of another embodiment of the instant disclosure.

As shown in FIG. 8, the lighting devices may be illuminated in any pattern, sequence, or order to illuminate or bring attention to a location of feature 730 for an approaching driver or user of vehicle 100. For example, the same lighting device 725 is depicted over a sequence of time steps (1), (2), (3), (4), and (5) so as to show a representative sequence of various lights or LED's of lighting device 725 being commanded to turn on and off. Initially, as shown at time step (1), all lights or LED's of lighting device 725 are off. Should an indication from a brake pedal sensor of the activation of the brake pedal of vehicle 100 by a driver be received, all lights or LED's of lighting device 725 may be commanded on.

Upon receiving a wireless communication from a mobile device 705 being in a predetermined vicinity of vehicle 100, at time step (2) system 700 is configured to control a first light or subset of LED's to turn on. At time step (3), system 700 is configured to control a second light or subset of LED's to turn on. The process is repeated for time steps (4) and (5), as shown in FIG. 8. One or more lights or LED's of lighting device 725 may be commanded by system 700 to turn off in reverse order or in any other order, sequence, pattern, timing or time delay. The lighting device 725 may be the one or more brake lights of the vehicle 100.

In any of the embodiments, the one or more lights or LED's of lighting device 725 may be configured to illuminate in any color, in multiple colors, in varying shades of the same or multiple colors, and in any order, sequence, pattern, timing, or time delay as described above to create any visual beacon to help a driver or user identify a location of a feature of vehicle 100. Any such beacon may be coupled with sounds, such as vehicle horn sounds or chirps, to provide an audio-visual combination beacon. The audio may or may not be synchronized with any visual aspects of the beacon.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

What is claimed is:

1. A vehicle, comprising:
   a steering system;
   a drive system;
   a brake system including a brake light and a brake pedal, the brake light including LEDs;
   a processor;
   memory;
   a control module coupled to the processor and configured to receive a wireless communication from a mobile device indicative of a user's proximity to the vehicle;
   a brake module coupled to the control module and configured to partially illuminate the LEDs of the brake light in proximity to an external vehicle feature on receipt of the wireless communication to assist a user approaching the vehicle to identify a location of the external vehicle feature; and
   a second brake module coupled to the control module and configured to illuminate all of the LEDs upon activation of the brake pedal.

2. The vehicle of claim 1, wherein the external vehicle feature is a trunk lid release button.

3. The vehicle of claim 1, wherein the mobile device is a key fob.

4. The vehicle of claim 1, wherein the brake module is configured to illuminate one or more of the LEDs in a pattern or in a sequence.

5. The vehicle of claim 1, wherein the brake module is configured to illuminate one or more of the LEDs while not illuminating other of the LEDs of the brake light.

6. A vehicle, comprising:
   a brake light including LEDs;
   a brake pedal;
   a body control module to receive an indication of user proximity to the vehicle;
   a brake control module coupled to the body control module to partially illuminate the LEDs upon indication receipt to assist in locating a vehicle feature; and
   a second brake control module coupled to the body control module to illuminate all of the LEDs on activation of the brake pedal.

7. The vehicle of claim 6, wherein the vehicle feature is a trunk lid release button.

8. The vehicle of claim 6, wherein the indication of user proximity includes a wireless communication from a mobile device and the mobile device is a key fob.

9. The vehicle of claim 6, wherein the indication of user proximity includes a wireless communication from a mobile device and the mobile device is a vehicle remote control.

10. The vehicle of claim 6, wherein the brake control module is configured to illuminate one or more of the LEDs in a pattern or in a sequence.

11. The vehicle of claim 6, wherein the one or more of the LEDs comprise a plurality of colors.

12. The vehicle of claim 6, wherein the brake control module is configured to illuminate one or more of the LEDs in proximity to the feature while not illuminating other of the LEDs of the brake light.

13. The vehicle of claim 6, wherein the brake control module is configured to illuminate one or more of the LEDs in proximity to the vehicle feature in a pattern or in a sequence while not illuminating other of the LEDs of the brake light on receipt of a wireless communication from a mobile device indicative of the user's proximity to the vehicle.

14. A vehicle, comprising:
   a controller to receive a wireless communication from a mobile device indicative of a user's proximity to a vehicle;
   a brake controller coupled to the controller to illuminate one or more LEDs of a brake light proximate to an external vehicle feature on receipt of the wireless communication to enable a user approaching the vehicle to identify a location of the vehicle feature; and
   a second brake controller coupled to the controller to illuminate all of the LEDs of the brake light on receipt of an indication of activation of a vehicle brake pedal.

15. The vehicle of claim 1, wherein the vehicle feature is a trunk lid release button, and the brake module is configured to illuminate one or more of the LEDs in a pattern or in a sequence in proximity to the trunk release button.

16. The vehicle of claim 6, wherein, to partially illuminate the LEDs, the brake control module is configured to illuminate one or more of the LEDs proximate to the vehicle feature and not illuminate another one or more of the LEDs.

* * * * *